J. FRIER.
DRIVING DEVICE FOR TALKING MACHINES.
APPLICATION FILED MAY 18, 1916.
1,228,014. Patented May 29, 1917.
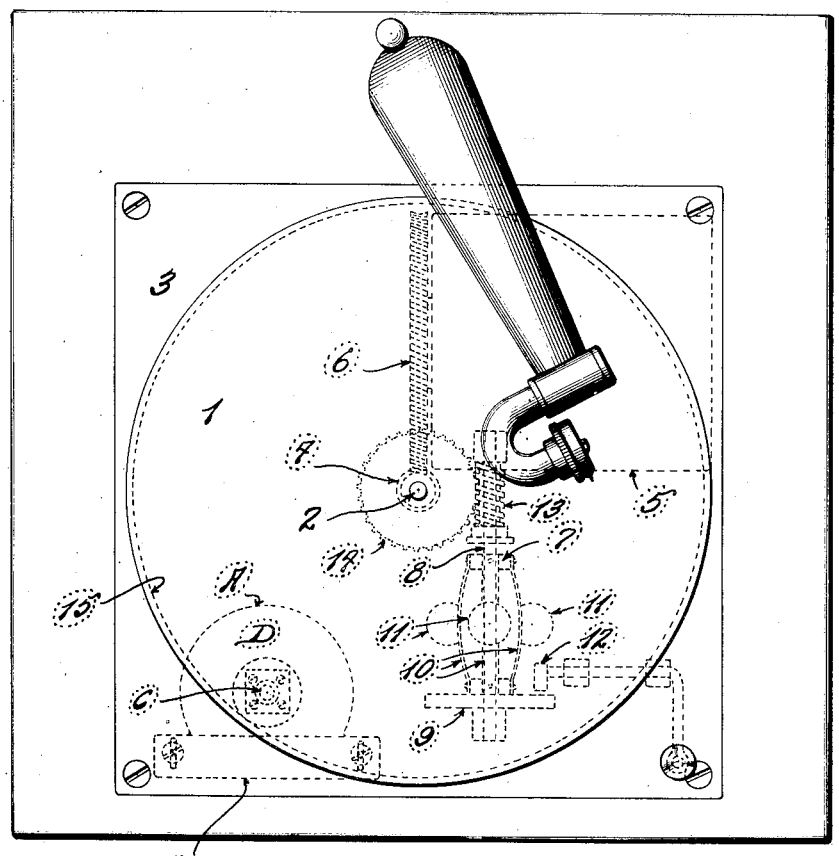

UNITED STATES PATENT OFFICE.

JOHN FRIER, OF ST. LOUIS, MISSOURI.

DRIVING DEVICE FOR TALKING-MACHINES.

1,228,014.  Specification of Letters Patent.  Patented May 29, 1917.

Application filed May 18, 1916. Serial No. 98,330.

*To all whom it may concern:*

Be it known that I, JOHN FRIER, a citizen of the United States of America, a resident of the city of St. Louis, State of Missouri, have invented certain new and useful Improvements in Driving Devices for Talking-Machines, of which the following is a full, clear, and exact description, reference being had to the accompanying drawing, forming a part of this specification.

My invention relates to means for driving talking machines, one of the objects being to produce a very simple and inexpensive driving device adapted to be easily and quickly attached to an ordinary spring driven talking machine, so as to serve as a substitute for the usual spring motor. With this object in view, the attachment preferably comprises an electric motor provided with a friction drive wheel adapted to engage the turn-table, or record holder, of the machine, and to avoid unnecessary expense, the driving attachment is so constructed and arranged that the speed governor, forming part of the talking machine, will be effective when the attachment is in service. The attachment may be readily applied without moving or in any way disturbing the spring motor and other driving elements of an ordinary spring driven talking machine.

Figure I is a top or plan view of an ordinary talking machine, equipped with my driving attachment.

Fig. II is an enlarged fragmentary section illustrating the driving attachment.

1 designates a turn-table, or record holder, fitted to the usual vertical spindle 2 in any suitable manner. The spindle passes through a base plate 3 and is provided with a worm 4 near its lower end. The usual spring motor 5, arranged below the base 3, is equipped with a drive wheel 6 which meshes with the worm 4. When the spring motor is in service, the worm, spindle and turn-table revolve rapidly in response to the rotary movement of the drive wheel 6.

The speed governor comprises a collar 7 fixed to a horizontal shaft 8, a friction wheel 9 slidably fitted to said shaft, springs 10 connecting the fixed collar 7 to the slidable friction wheel 9, weights 11 secured to said spring and a friction member 12 adapted to be engaged by the friction wheel 9. The governor is driven through the medium of a worm 13 secured to the shaft 8, and a worm wheel 14 secured to the spindle 2 and meshing with said worm 13. When the turn-table rotates at a predetermined rate of speed, the friction wheel 9 will engage the friction member 12 to prevent an increase in the speed, as is well understood in this art.

The driving attachment preferably comprises an electric motor A secured to the bracket arm B, the latter being adjustably attached to the plate 3 by means of screws which pass through slots at the upper end of the bracket.

The record turn-table 1 has the usual downturned annular flange 15 at its outer margin. A power shaft C, extending upwardly from the electric motor A, is provided at its upper end with a friction drive wheel D which engages the inner face of the downturned annular flange 15. It will be noted that the motor and its friction wheel D may be easily and quickly applied to an ordinary spring driven talking machine without in any way interfering with the ordinary driving elements of the machine. When the driving attachment is in service, movement is transmitted from the friction drive wheel B to the turn-table, through spindle 2, worm wheel 14 and worm 13 to the governor, the latter serving to regulate the speed of the machine when the driving attachment is in operation.

The friction drive wheel D is preferably provided with a yieldable peripheral portion which engages the downturned flange 15 on the turn-table, and which yields freely to compensate for inaccuracies in the construction and arrangement of the driving elements.

I claim:—

The combination, with a record turn-table having a depending annular flange and a base-plate; of a depending bracket secured to the base-plate; a motor mounted on the bracket, a vertical power-shaft on the motor, extending upwardly through the base-plate and a drive-wheel provided on the power-shaft and engaging the inner face of the depending annular flange of the record turn-table.

JOHN FRIER.